JOHN H. GEE.
Improvement in Shackle Irons.
104015          PATENTED JUN 7 1870
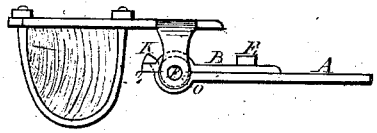
Fig. 1.
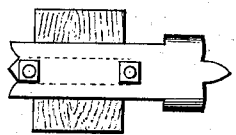 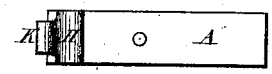
Fig. 2.      Fig. 3.
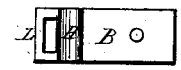
Fig. 4.
Witnesses:              Inventor:
John H. Gee
by A. P. Thayer
atty

United States Patent Office.

JOHN H. GEE, OF CORTLAND, NEW YORK, ASSIGNOR TO GEORGE T. CHAPMAN, OF NEW YORK CITY.

*Letters Patent No. 104,015, dated June 7, 1870.*

IMPROVEMENT IN THILL-COUPLING.

The Schedule referred to in these Letters Patent and making part of the same.

*To all whom it may concern:*

Be it known that I, JOHN H. GEE, of Cortland, in the county of Cortland, in the State of New York, have invented an Improved Shackle or Thill-Iron for Wagons, &c.; and I do hereby declare that the following is a full and exact description thereof, reference being had to the accompanying drawings and to the letters of reference marked thereon.

My invention relates to improvements in the manner of connecting the shackle-irons together at the ends behind, or near the bolt of the clip, when the said irons are made in two separate parts, one of which is attached permanently to the shaft or pole, the other being detachable, to be attached to the first when the shafts or poles are coupled, and detached when uncoupled.

The said invention has for its object an arrangement which may be cheaply constructed, easily coupled or uncoupled, and which, in the coupling, will compress the India-rubber or other packing commonly employed between the bolt of the clip and the walls of the eye formed by the recesses in the shackle-irons which receive the bolt, as in the patent to Miner, Stevens & Saunders, firmly around the said bolt to prevent noise and wear.

Figure 1 is a side elevation of the shackle-irons connected together;

Figure 2 is a plan of a part of fig. 3;

Figure 3 is a plan of the long shackle-iron, detached from the other parts; and

Figure 4 is a plan of the under side of the short shackle-iron.

I make the shackle-irons A B of any suitable metal, but preferably of wrought or malleable iron, and, in the case of wrought iron, I prefer to strike them up in dies, or, perhaps, in some cases, to first forge them out roughly, and then subject them to the action of dies.

The one, A, is made longer than the other, and may be attached to the shaft or pole C by one or more rivets or screws, D; also, by a bolt and nut, E, which are also designed to connect the short iron B, as shown in fig. 2.

The shackle-iron A is provided, near the end, for coupling to the bolt F of the clip G, with a transverse semicircular recess, H, for the bolt or the bolt and packing, and terminates at the other end, in a hook-shaped projection, K, somewhat narrower than the other part of the plate, the said hook curving backward from the recess nearly into the plane of the plate.

The other iron, B, is provided with a similar transverse semicircular groove, for the bolt F, and terminates in a projection, L, provided with a transverse slot, fitted to receive the hook-shaped projection K, shown in fig. 1, care being taken to so shape the projection L and the hook that, the hook being inserted, which is done when the opposite ends of the plates are considerably separated from each other, and the two irons are brought together, they will compress the packing O firmly on the bolt.

The clip G may be of any approved form suited to the case in hand, but should, preferably, have the bolt F permanently connected to the ears.

It will be seen that these shackle-irons may be made very cheaply, either by striking up in dies or by casting, either piece being capable of being formed with the requisite shape by one blow of a drop-press, and requiring but little or no finishing.

Of course, the iron having the hook may be attached so as to be placed either above or below the bolt F, the other being arranged correspondingly, and either may be attached permanently to the shaft or pole.

Instead of making the grooves H in the irons semicircular, as above stated, it may be found desirable, in some cases, to make one greater and the other less than a semicircle. Of course, both of the grooves are to be enough larger than the bolt F to make room for the packing O when it is used.

It will also be observed that, by these improvements in the shackle-irons, they may be much more cheaply made, and the coupling of the shafts or poles with the clips can be much more easily done than in the case of the Miner, Stevens & Saunders' patent, above referred to, the object of which is also to clamp the packing tightly, to prevent noise.

Having thus fully described my invention,

What I claim, and desire to secure by Letters Patent, is—

As an improved article of manufacture, a shaft-shackle composed of the parts A B, having the semicircular grooves H, the one part being provided with a curved hook-like projection, and the other part with a slot or opening to receive the hook, the two parts being connected together, when placed about the bolt of the clip, by the said hooked and slotted projections, and by a bolt or screw, all substantially as specified.

JOHN H. GEE.

Witnesses:
ARTHUR HOLMES,
GEO. F. HOLMES.